(12) United States Patent
Reilly

(10) Patent No.: US 6,389,390 B1
(45) Date of Patent: May 14, 2002

(54) METHOD OF COMPRESSING AND DECOMPRESSING AN AUDIO SIGNAL

(75) Inventor: Andrew Reilly, Hurlstone Park (AU)

(73) Assignee: Lake DSP Pty Ltd, Ultimo (AU)

( * ) Notice: Subject to any disclaimer, the term of this patent is extended or adjusted under 35 U.S.C. 154(b) by 0 days.

(21) Appl. No.: 09/281,770

(22) Filed: Mar. 30, 1999

(30) Foreign Application Priority Data

Mar. 31, 1998 (AU) .............................................. PP2732

(51) Int. Cl.[7] .............................................. G10L 21/04
(52) U.S. Cl. ........................................ 704/229; 704/501
(58) Field of Search ................................ 704/200, 212, 704/222, 229, 230, 500, 501, 502, 504

(56) References Cited

U.S. PATENT DOCUMENTS

| | | | | |
|---|---|---|---|---|
| 3,723,879 A | * | 3/1973 | Kaul et al. ................... | 704/212 |
| 4,870,685 A | * | 9/1989 | Kadokawa et al. .......... | 704/212 |
| 5,696,876 A | * | 12/1997 | Lee .............................. | 704/229 |
| 5,893,065 A | * | 4/1999 | Fukuchi ....................... | 704/500 |
| 5,924,060 A | * | 7/1999 | Brandenburg ................ | 704/200 |
| 6,016,111 A | * | 1/2000 | Park et al. ..................... | 341/55 |
| RE36,683 E | * | 5/2000 | Tsutsui ......................... | 704/229 |
| 6,122,618 A | * | 9/2000 | Park ............................. | 704/500 |

* cited by examiner

Primary Examiner—William Korzuch
Assistant Examiner—Abul K. Azad
(74) Attorney, Agent, or Firm—Fulwider Patton Lee & Utecht, LLP

(57) ABSTRACT

A method of compressing an audio signal comprising a series of values is disclosed, the method comprising: utilising a predetermined maximum number of bits B for representing values; dividing the audio signal into a series of blocks of a predetermined length N; and for each of the blocks: computing the maximum number of bits b required to represent the values within a block; packing an indicator of b bits in an output stream; and for each value within the block: where the value exceeds $2^B$ writing only the b most significant bits to the output stream; and where the value does not exceed $2^B$ writing the value to the output stream. The aforementioned methods are well suited to compressing impulse response functions. There is also disclosed a method of decoding an audio signal encoded by the aforementioned methods.

6 Claims, 3 Drawing Sheets

METHOD OF COMPRESSING AND DECOMPRESSING AN AUDIO SIGNAL

FIELD OF THE INVENTION

The present invention relates to the compression of impulse response signals such as those derived from an impulse response measurement of a room or environment.

BACKGROUND OF THE INVENTION

Room impulse responses are heavily utilised in convolution of audio signals so as to produce improved audio responses.

Turning initially to FIG. 1, there is illustrated the first 10,000 samples of a room impulse response signal. It can be seen from FIG. 1 that most room impulse response, signals have the characteristic of having several regions of significant energy surrounded by large regions of very low energy including a "tail" that tends to diminish to zero.

Unfortunately, given a predetermined level of quantisation, the number of bits necessary to represent the high energy sections eg 1 will be substantially greater than the number required for the low energy sections eg 2.

It would therefore be desirable if a method could be provided for a small compact form of representation of the room impulse response.

SUMMARY OF THE INVENTION

In accordance with a first aspect of the present invention, there is provided a method of compressing an audio signal comprising a series of values, the method comprising dividing the audio signal into a series of blocks of a predetermined length; and for each of the blocks: computing the maximum number of bits required to represent the values within a block; packing an indicator of the maximum number of bits in an output stream; and packing only the maximum number of bits of each coefficient value in the value in the bitstream.

In accordance with a second aspect of the present invention, there is provided a method of compressing an audio signal comprising a series of values, the method comprising: utilising a predetermined maximum number of bits B for representing values; dividing the audio signal into a series of blocks of a predetermined length N; and for each of the blocks:

computing the maximum number of bits b required to represent the values within a block;

packing an indicator of b bits in an output stream; and for each value within the block:

where the value exceeds $2^B$ writing the value to the output stream.

The aforementioned methods are well suited to compressing impulse response functions.

In accordance with ta further aspect of the present invention, there is provided a method fo decoding an audio signal encoded by the aforementioned methods.

BRIEF DESCRIPTION OF THE DRAWINGS

Notwithstanding any other forms which may fall within the scope of the present invention, preferred forms of the invention will now be described, by way of example only, with reference to the accompanying drawings in which.

DESCRIPTION OF PREFERRED AND OTHER EMBODIMENTS

In the preferred embodiment, a technique for compression of the impulse room response function is utilised whereby the impulse response function is broken into a number of contiguous blocks and each block is separately compressed so as to maximise the block compression.

Figure 1:
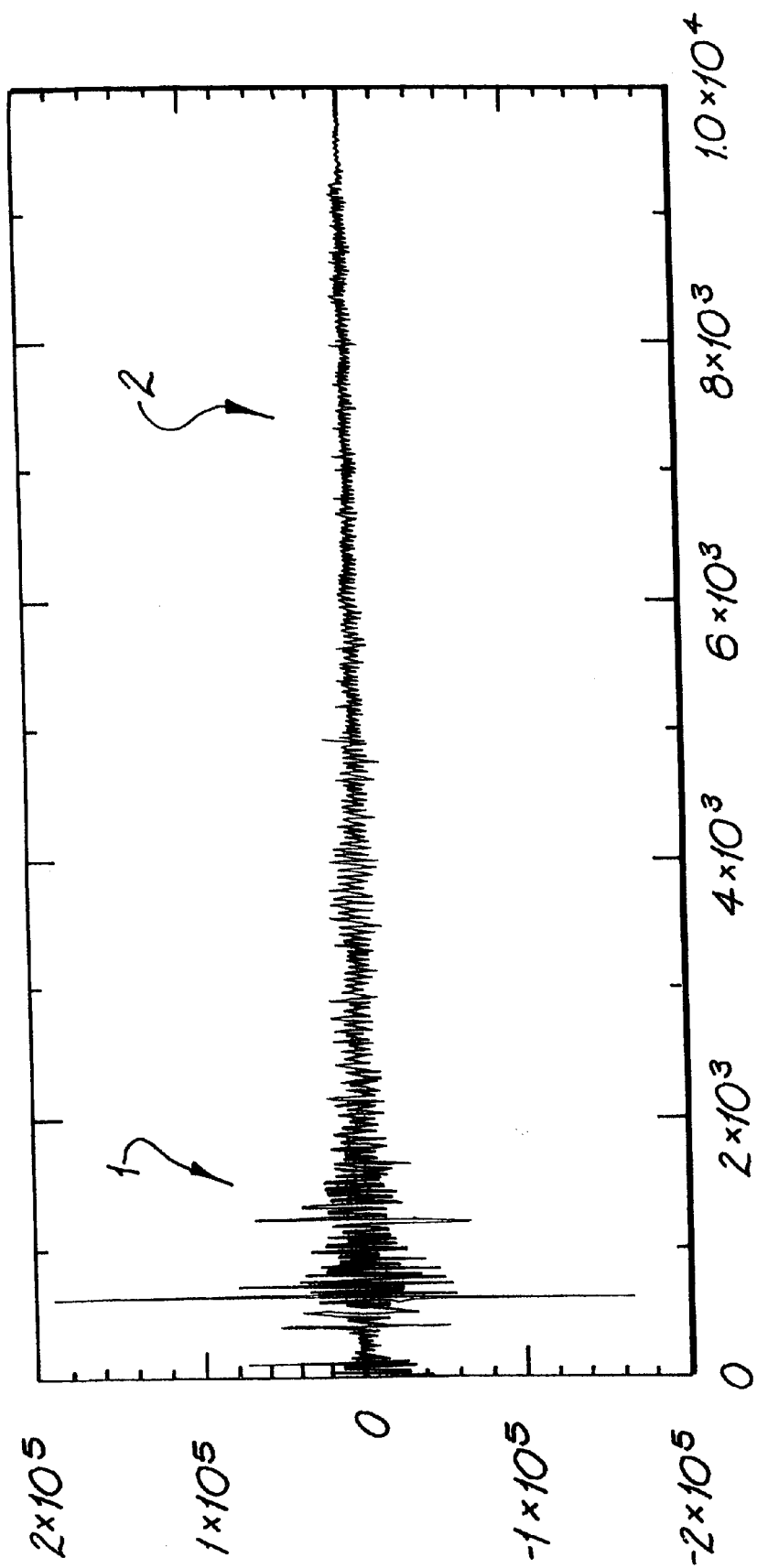
FIG. 1 illustrates an example impulse response.
Figure 2:
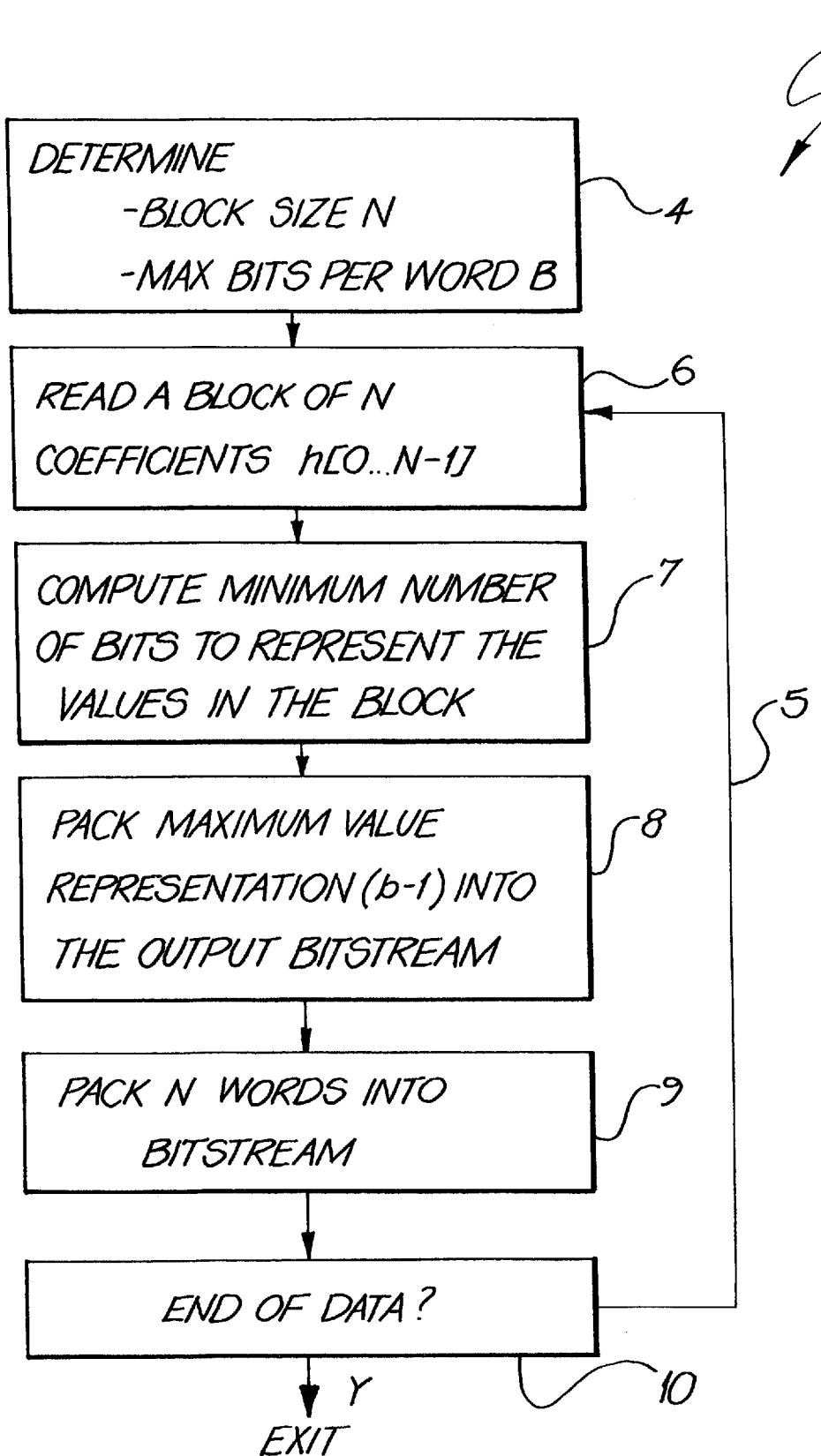
FIG. 2 illustrates the steps in the compression process of the preferred embodiment.

Turning to FIG. 2, there is illustrated a flow chart of the steps 3 involved in the compression process. The first step 4 is to determine a block size N which is the number of contiguous values to represent within a single block. The size of them can be varied in accordance with the predetermined requirements. Also, the variable B is provided which is the maximum number of bits to be utilised per coefficient word. The variable B providing for varying degrees of loss of the lower bits of a coefficient.

The compression process then proceeds around the loop 5 with the first step 6 being the reading of a block of N coefficients being stored as array values h[0 ... N−1]. Next, a minimum number of bits b required to represent all of the values in the block is determined as follows:

$$m1 = \max_{n=0}^{N-1}(-h[n]) \qquad h(n) < 0$$

$$m2 = \max_{n=0}^{N-1}(h[n]+1) \qquad h[n] \geq 0$$

$$b = [\log_{2(max(m1,m2))}] + 1$$

The value b−1 is then packed into the output stream utilising only as many bits as can possibly be required, given the dynamic range for coefficients. For example, when utilising 16 bit coefficients, b requires 4 bits. For 24 or 32 bit representations b requires 5 bits. The number of bits utilised is predetermined and known by the compression and decompression process.

Next, at the step 9, each of the N words in the block is packed into the output bitstream as:

(a) if b≦B then insert the lower order b bits otherwise (b) if b>B then insert the B bits numbered [b−B, b]. (The lowest b−B bits are lost at this point, resulting in loss in compression.)

Next, a determination is made 10 to see if the end of the data stream is reached in which case the compression process has finished otherwise the process returns to acquire the next block 6.

Figure 3:
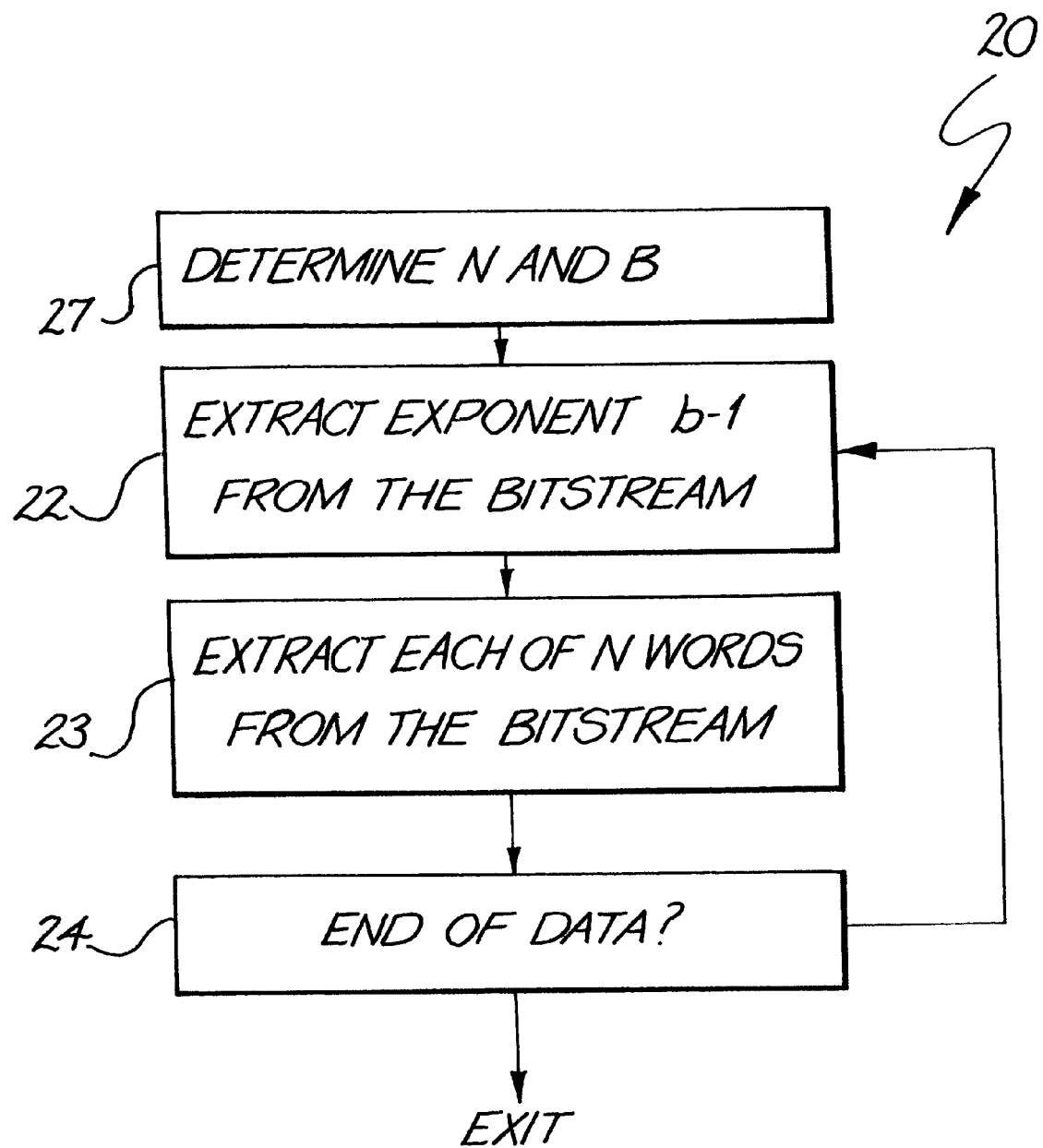
FIG. 3 illustrates the steps in the decompression process of the preferred embodiment.

The decompression process can then proceed utilising the steps 20 as illustrated in FIG. 3. The first step 21 involves utilising the predetermined values of N which is the number of samples in each block and B which is the size of the expanded field. The length of the coefficient stream can then be determined which must be an even multiple of N.

For each block the initial step 22 is to extract the exponent b−1 from the bitstream. Next, each of the N words in the block are extracted as follows:

(a) if b≦B then extract b bits from the bitstream into the lowest b bits of a W (≧max (b)) bit variable, and then copy bit b1−1 to bits [b, W−1] (Sign extended)

(b) If b>B then extract B bits from the bistream as in step (a) above, and then multiply the result by $2^{b-B}$.

Next, the determination is made 24 if the end of the data is reached in which case the decompression process exits otherwise it returns to step 22.

It can be seen from the foregoing description that an efficient method is provided for compression and decompression of impulse room responses that utilises their structure to advantage so as to maximise the compression ratio.

It would be appreciated by a person skilled in the art that numerous variations and/or modifications may be made to the present invention as shown in the specific embodiment without departing from the spirit or scope of the invention as broadly described. The present embodiment is, therefore, to be considered in all respects to be illustrative and not restrictive.

What is claimed is:

1. A method of compressing an audio signal comprising a series of values into an output data stream, said method comprising:

utilising a predetermined maximum number of bits B for representing said values;

dividing said audio signal into a plurality of blocks of a predetermined length, each block comprising a series of individual values;

for each of said blocks:

computing the minimum number of bits per value, b, required to represent all of said individual values within the block;

packing an indicator of b in said output data stream; and for each individual value within said block:

where said b exceeds B writing only B most significant bits of said individual value to the output stream; and where said b does not exceed B writing said individual value to said output stream as a stream of b bits.

2. A method as claimed in claim 1 wherein said audio signal represents an impulse response function.

3. A method as claimed in claim 2 wherein said impulse function is measured in a room.

4. A method of decoding an audio signal encoded by the method as claimed in claim 1.

5. A method of compressing an audio signal according to claim 2 in which the step of computing the minimum number of bits per value b includes the steps of reading a block of N coefficients stored as array of values h(o . . . N−1), and determining the minimum number of bits b on the basis of the following formulae:

$$m1 = \max_{n=0}^{N-1}(-h[n]) \qquad h(n) < 0$$

$$m2 = \max_{n=0}^{N-1}(h[n] + 1) \qquad h[n] \geq 0$$

$$b = [\log_{2(max(m1,m2))}] + 1.$$

6. A method of decoding an audio signal according to claim 4, comprising the steps of extracting all of the indicators b in respect of each of the blocks from the output data stream, and extracting words representative of the values in each of the blocks, wherein the word extraction step includes, if $b \leq B$, extracting b bits from the bitstream into the lowest b bits of a W ($\geq \max (b)$) bit variable, and then copy bit b1−1 to bits [b, w−1] and, if $b \geq B$ then extracting B bits from the bitstream and then multiplying the result by $2^{b-B}$.

* * * * *